United States Patent [19]
Blitchington, Jr.

[11] 3,749,830
[45] July 31, 1973

[54] PATTERN SENSING AND POSITIONING SYSTEM

[75] Inventor: Frank H. Blitchington, Jr., Greensboro, N.C.

[73] Assignee: Western Electric Company, Incorporated, New York, N.Y.

[22] Filed: Apr. 9, 1968

[21] Appl. No.: 719,923

[52] U.S. Cl.............. 178/6.8, 178/DIG. 1, 250/222
[51] Int. Cl. ............................................. H04n 7/18
[58] Field of Search ................. 33/174 P; 250/221, 250/222, 232, 224, 219 DR; 178/DIG. 1, 6.8; 318/20.320, 20.370, 20.605

[56] References Cited
UNITED STATES PATENTS

| | | | |
|---|---|---|---|
| 2,230,715 | 2/1941 | Cockrell | 250/219 RG |
| 2,356,567 | 8/1944 | Cockrell | 20/219 RG |
| 2,629,936 | 3/1953 | Cronstedt | 33/174 |
| 3,038,369 | 6/1962 | Davis | 250/232 |
| 3,207,904 | 9/1965 | Heinz | 250/222 |
| 3,219,894 | 11/1965 | Rosch | 178/DIG. 1 |
| 3,230,308 | 1/1966 | Lewczyk | 178/DIG. 1 |
| 3,244,810 | 4/1966 | Williams | 178/DIG. 1 |
| 3,390,229 | 6/1968 | Williams | 178/7.2 |

*Primary Examiner*—Robert L. Griffin
*Assistant Examiner*—Joseph A. Orsino, Jr.
*Attorney*—H. J. Winegar, R. P. Miller and S. Gundersen

[57] ABSTRACT

Circuitry senses a particular pattern or indicia in the output of a video camera to produce a pulse indicative of the position of the pattern. A control circuit senses the time of the pulse relative to respective horizontal and vertical control pulses to drive a positioning mechanism to position the pattern or indicia in accordance with the horizontal and vertical controlling pulses.

26 Claims, 9 Drawing Figures

PATTERN SENSING AND POSITIONING SYSTEM

Background of the Invention

1. Field of the Invention

This invention is concerned with systems for automatically and precisely positioning an object or a workpiece relative to an apparatus or a tool. One use may be found for such a system in the manufacture of printed circuit boards or the like wherein holes must be drilled through the circuit board material in the exact location of etched holes in the copper pattern on the board. Due to distortion of the circuit board material during handling and etching of the holes in the copper pattern, the positions of the holes vary on different circuit boards having the same pattern. Conventional numerical controlled positioning apparatus, while able to accurately position the board relative to the apparatus, can not predict or sense the actual position of the hole in the copper pattern.

2. Description of the Prior Art

Several systems have been developed in the prior art which can actually sense the position of an object and move the object relative to an apparatus or tool. Among these are conventional photocell systems, radio frequency capacitance probe systems, and several video camera systems. The photocell and capacitance probe systems along with many other systems are not accurate enough to reliably position the object within the desired tolerance.

The prior art video camera systems generally rely upon particular characteristics of the scan in order to develop analog voltages to control the positioning mechanism. The positioning mechanism is usually unstable or not accurate enough to move the object within the desired tolerance. The prior art video camera systems generally cannot be adapted to position diverse objects or workpieces. Also, discontinuities, such as dirt, inconsistent lighting, and variable intensity of the object or background, destroy the reliability and usefulness of the prior art systems.

Summary of the Invention

Accordingly, it is an object of the invention to utilize digital techniques to position an object or workpiece relative to a tool or similar device.

The invention utilizes circuitry which senses a particular size and shape of a pattern or indicia on the object to produce a pulse indicative of the actual position of the object. A control circuit produces one or more positioning pulses indicative of the desired position of the object relative to the apparatus. The relative time relationship of the positioning pulses are compared with the pulse produced by the size and shape sensing circuitry to operate facilities for moving the object relative to the apparatus until the object is aligned in accordance with the positioning pulses.

Another feature of the invention is the circuitry for detecting the size and shape of the pattern in a video signal from a camera. The circuitry senses first and second pulses in the video signal having respective first and second durations. The first pulse is delayed, and if the delayed first pulse coincides with the second pulse, a pattern having the predetermined size and shape has been detected.

Detailed Description

Figure 1:
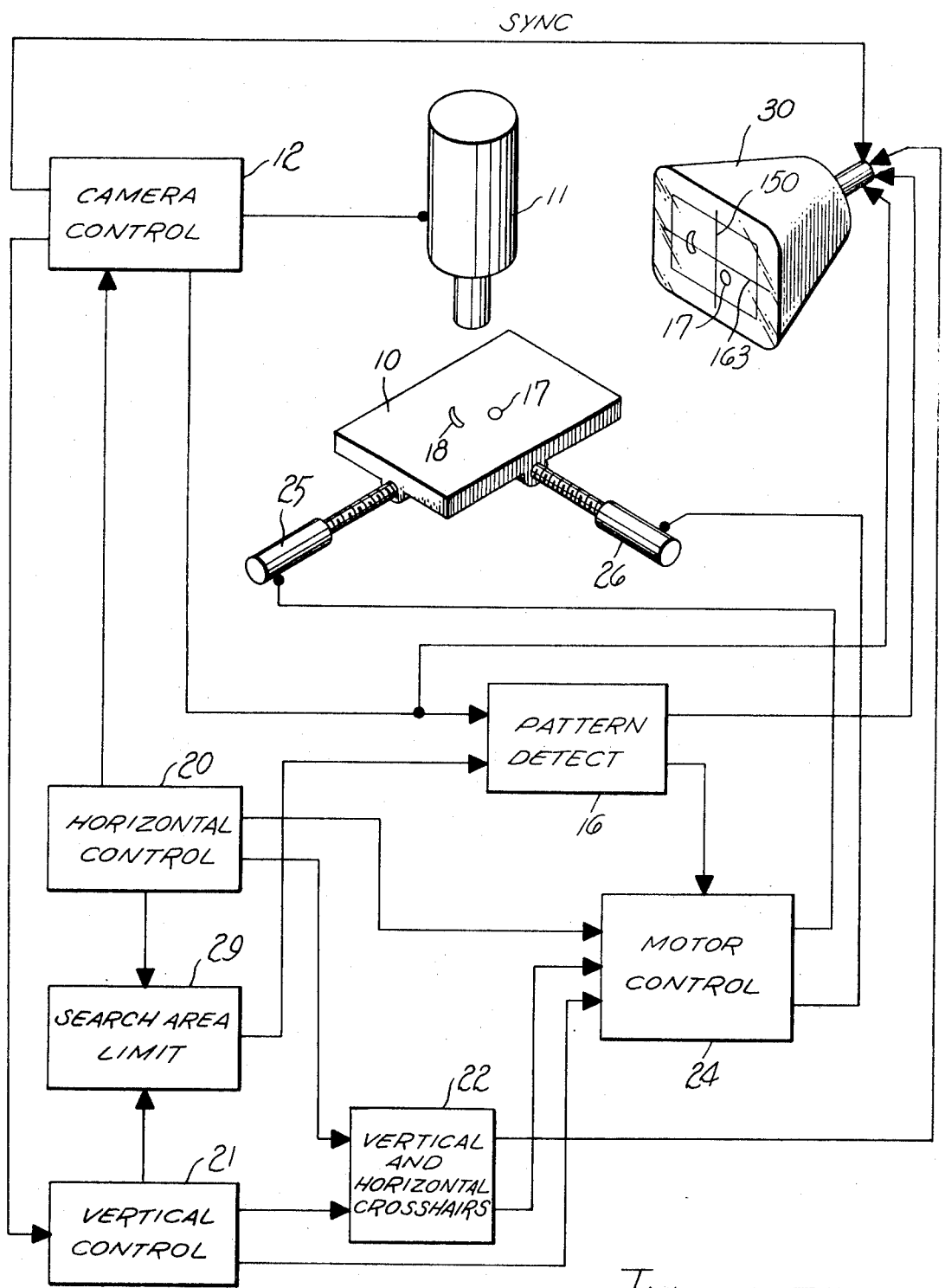
FIG. 1 is a block diagram of a system for sensing and positioning a workpiece relative to a video camera or work tool.

Referring to FIG. 1, there is shown a system for positioning an object or workpiece 10 relative to a video camera 11. The video camera 11 and the camera control circuit 12 are commercially available units. The camera 10 and control circuit 12 employ the normal T. V. scan utilized in the United States which has alternate interlaced vertical scans of 262-½ horizontal sweeps per scan. The commercial camera control circuit 12 has provision for an external horizontal sync pulse or such a provision is made in the camera sync pulse generator in a conventional manner. One suitable commercial camera is Model No. 2000, sold by Cohu Electronics, under the Trademark KINTEL. The camera control circuit is Model No. 3900, sold by the same company.

The horizontal control circuit 20 supplies a sync pulse to the external horizontal sync pulse input of the camera circuit 12 to accurately control the timing of the horizontal sweep of the camera 11 with respect to the horizontal control circuit 20. Horizontal and vertical sync pulses from the camera control circuit 12 are applied to a vertical control circuit 21 to accurately control the timing of the operation of the vertical control circuit 21 with respect to each horizontal sweep and each vertical scan.

The horizontal and vertical control circuits 20 and 21 control the output of a cross hair circuit 22 which produces vertical and horizontal cross hairs. The cross hair circuit 22 produces one horizontal positioning pulse during each horizontal sweep to correspond to a selected horizontal position of the object 10. When all of the horizontal positioning pulses are displayed on a monitor 30, the horizontal positioning pulses define a vertical cross hair 150. During each vertical scan, the cross hair circuit 22 produces one vertical control pulse having a duration of one horizontal sweep. As viewed on the monitor 30, the vertical control pulse defines a horizontal cross hair 163.

The video output of the camera 11 is applied to a pattern detecting circuit 16 which produces an output pulse when a particular pattern or indicia on the object 10 is detected. For example, the pattern detecting circuit 16 detects a round pattern 17, such as a hole, on the workpiece 10 but rejects the odd shaped dirt spot 18 on the object 10. When the round pattern 17 is detected, the detecting circuit 16 produces an output pulse which has a definite time relationship with respect to the scan of the pattern 17.

During a first scan, the output of the detecting circuit 16 is sensed by a motor control circuit 24 to determine if only one pattern has been detected. During the next scan, and only if one hole was sensed during the first scan, the horizontal and vertical positioning pulses from the cross hair circuit 22 along with the pulse from the pattern detecting circuit 16, operate the motor control circuit 24 which senses the relative time relationship of the pulse from the pattern detecting circuit 24 with respect to the horizontal and vertical positioning pulses from the cross hair circuit 22. Using only alternate scans to control the motor positioning apparatus allows the use of commercial T. V. camera equipment employing 2:1 interlaced scans without causing the motor positioning apparatus to become unstable. The motor control circuit 24 then operates motors 25 and 26 to move the object 10 with respect to the camera 11 until the pulse from the pattern detecting circuit 16 reaches a predetermined time relationship with respect to the horizontal and vertical positioning pulses from the cross hair circuit 22.

Since both the left and right edges of the horizontal sweep and also the upper and lower edges of the vertical scan are apt to be non-linear, a search area limit circuit 29 is controlled by the horizontal control circuit 20 and the vertical control circuit 21 to limit the area in which the pattern detecting circuit 16 may sense a pattern 17.

HORIZONTAL TIMING CONTROL

Figure 2:
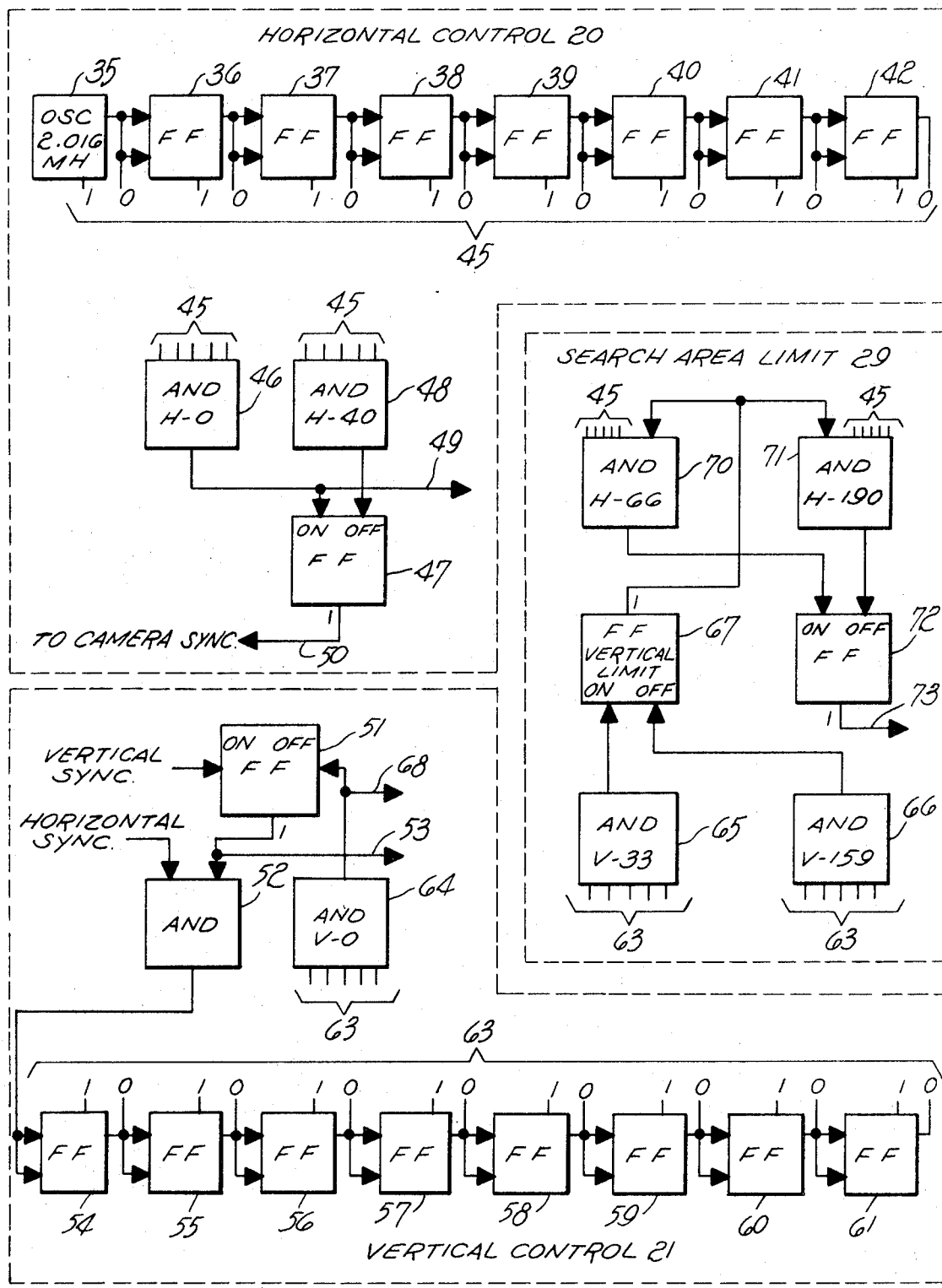
FIG. 2 is a more detailed block diagram of a portion of the circuit shown in FIG. 1, particularly showing a horizontal control circuit, a vertical control circuit and a search area limit circuit.

Referring now to FIG. 2, the horizontal control circuit 20 contains a time base generator including an oscillator 35 which operates flip-flops 36–42 in a binary counting arrangement. The outputs (generally designated 45) of the oscillator 35 and flip-flops 36–42, produce 256 different combinations of output signals as the counter is stepped by each cycle of the oscillator 35. One particular combination of output signals is designated H-0. The succeeding combinations of output signals are serially designated H-1 through H-255. Since each combination of output signals on the outputs 45 occurs at a different time, H-0 through H-255 designate 256 distinct times.

Various of the outputs 45 are connected as inputs to AND gate 46 such that the AND gate 46 produces an output pulse at time H-0. The output pulse of AND gate 46 is applied to the "on" input of a flip-flop 47 to switch the flip-flop 47 from off to on. Similarly, various of the outputs 45 are applied to an AND gate 48 such that the AND gate 48 applies a pulse at time H-40 to the flip-flop 47 to turn off the flip-flop 47. The 1 output of the flip-flop 47 is connected by a line 50 to the external horizontal sync input of the camera control circuit 12 (FIG. 1). Since the start of each horizontal sweep in the camera 11 is controlled by the output of the flip-flop 47, every horizontal sweep is in the same horizontal position at a selected time from the times H-0 through H-255. Of course, certain of the times H-0 through H-255 occur during retrace and blanked out portions of the horizontal sweep.

VERTICAL TIMING CONTROL

As shown in FIG. 2, the vertical control circuit 21 includes a flip-flop 51 which is turned on by a vertical sync pulse produced by the camera control circuit 12. The flip-flop 51, when turned on, applies an output signal to the input of AND gate 52. A horizontal sync pulse, produced by the camera control circuit 12, is applied to the other input of the AND gate 52 to produce an output pulse from the AND gate 52, between each horizontal sweep. The output of AND gate 52 is applied to flip-flops 54–61 connected as a binary counter. The outputs (generally designated 63) of the flip-flops 54–61 produce 256 different combinations of output signals which are designated V-0 through V-255. The designations V-0 through V-255 define distinct times which are repeated every vertical scan. Various of the outputs 63 are applied to inputs of an AND gate 64 to apply a pulse at time V-0 to the "off" input flip-flop 51 to turn off the flip-flop 51. Since there are more than 256 horizontal sync pulses produced during one vertical scan, only the first 256 horizontal sync pulses occuring after the vertical sync pulse are counted by the flip-flops 54–61. The remaining horizontal sync pulses produced during the remaining horizontal sweeps and the vertical retrace periods are blocked by the AND gate 52.

SEARCH AREA LIMIT

Referring now to the detailed block diagram of the search area limit circuit 29 in FIG. 2, various of the outputs 63 of the flip-flops 54-61 are applied to inputs of AND gates 65 and 66. The AND gate 65 may be connected to produce an output pulse, for example, at time V-33. The AND gate 66 may be connected to produce an output pulse, for example, at time V-159. The outputs of the AND gates 65 and 66 are applied to respective inputs of the flip-flop 67 such that the flip-flop 67 produces an output pulse from the time V-33 to the time V-159. The AND gates 65 and 66 and the flip-flop 67 determine the vertical limits during which the pattern detecting circuit 16 (FIG. 1) will be allowed to detect the round pattern 17.

Various of the outputs 45 along with the output of the flip-flop 67 are applied to the inputs of AND gates 70 and 71. The AND gate 70 may be connected, for example, to produce an output pulse each time that the time H-66 occurs between the times V-33 and V-159. The AND gates 71 may be connected, for example, to produce an output pulse each time that the time H-190 occurs between times V-33 and V-159. The outputs of the AND gates 70 and 71 turn on and then off a flip-flop 72 which produces an output signal on line 73 which is connected to the pattern detecting circuit 16 to limit the horizontal area of search. An output signal is produced on line 73 from time H-66 to time H-190 only when such times occur between times V-33 and V-159.

PATTERN OR SIZE AND SHAPE DETECTING

Figure 3:
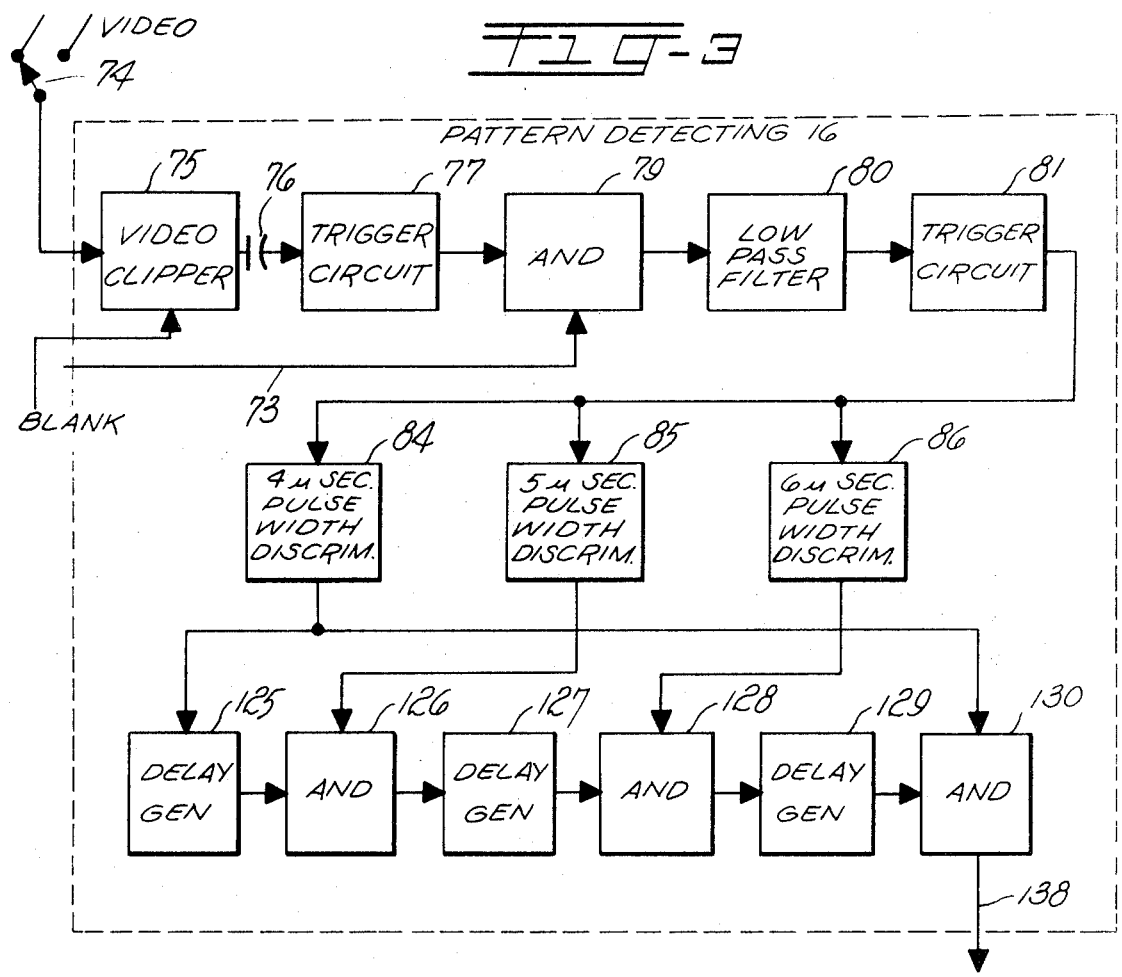
FIG. 3 is a detailed block diagram of a portion of the circuit shown in FIG. 1, particularly showing a pattern detecting circuit.

Referring now to FIG. 3, the video output of the video camera 11 is applied through a switch 74 to a video clipper circuit 75 in the pattern detecting circuit 16 along with blanking signals from the camera control circuit 12. The switch 74 allows the connection of alternate polarities of video depending upon whether the pattern 17 is lighter or darker than the object 10. The video clipper 75 operates as a gate to pass only the portion of the video signal representing light intensity during each horizontal scan. All the horizontal and vertical sync pulses together with the blanking pulses are blocked by the clipper 75. The output of the video clipper 75 is applied through a capacitor 76 to a trigger circuit 77. The trigger circuit 77 is Schmitt trigger circuit or squaring circuit which may be adjusted to be triggered when a certain voltage level is applied to its input. The capacitor 76 charges to a voltage dependent upon the average voltage level of the video signal from the clipper 75. The charge on the capacitor compensates for work areas which may be either slightly lighter or darker than normally encountered. The output of the trigger circuit 77 is a black and white video (no gray tones) representation only of those areas on the object 10 which are sufficiently darker or lighter, dependent upon the position of switch 74, than the average intensity of the object 10.

The output of the trigger circuit 77 is applied to an AND gate 79 which is controlled by a signal on the sine 73 from the search area limit circuit 29 (FIG. 2). The video signal is passed by the AND gate 79 only during the time that a signal is produced by the flip-flop 72 (FIG. 2), in the search area limit circuit 29. The video signal passing through the gate 79 is then applied to a series connected low pass filter 80 and trigger circuit 81. The trigger circuit 81 is also a squaring circuit or a Schmitt trigger. The combination of the low pass filter 80 and trigger circuit 81 removes all video signals which have short time durations such as that which may be produced by small particles of dirt. This prevents a surface covered by spots, such as dirt spots, from giving a false indication of the pattern 17. The output of the trigger circuit 81 is somewhat delayed due to the delaying effect of the low pass filter 80.

Figure 4:
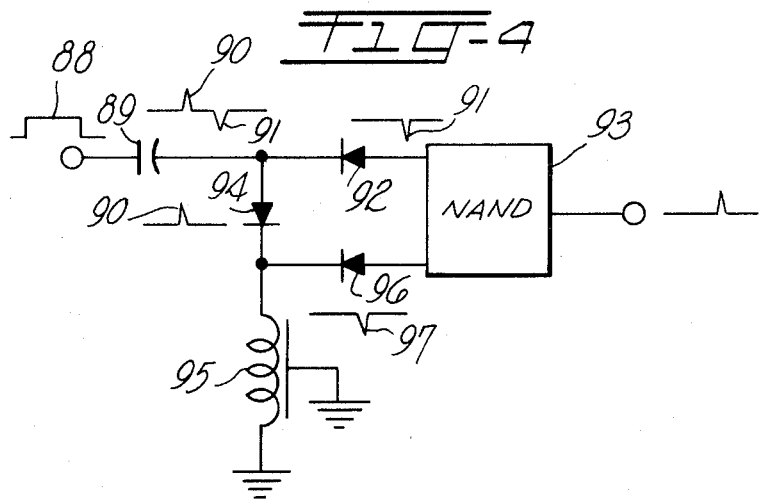
FIG. 4 is a detailed drawing or a pulse width discriminator of FIG. 3.

The output of the Schmitt trigger circuit 81 is applied to three pulse width discriminators 84, 85 and 86. Referring to FIG. 4, there is shown a detailed schematic of a pulse width discriminator which senses only a pulse of a predetermined width. The incoming pulse 88 is applied through a capacitor 89 which differentiates the pulse producing a positive spike 90 on the leading edge of the pulse 88 and a negative spike 91 on the trailing edge of the pulse 88. The negative spike 91 is passed by a diode 92 to one input of a NAND gate 93. The positive spike 90 is passed by a diode 94 to one end of a delay line 95. The other end of the delay line 95 is grounded such that the positive going spike 91 is reversed in polarity and reflected back as a negative spike 97 through the delay line 95. The spike 97 is passed by a diode 96 to the other input of the NAND gate 93. If there is a concurrence of the negative spikes 91 and 97, the NAND gate 93 produces an output pulse. The delay time of the delay line 95 is chosen to be one half of the desired width of the pulse to be sensed. For example, for a four microsecond pulse width discriminator, the delay line 95 would have a two microsecond delay. Referring back to FIG. 3, it is shown, for example, that the pulse width discriminator 84 senses a four microsecond width pulse, the pulse width discriminator 85 senses a 5 microsecond width pulse, and the pulse width discriminator 86 senses a 6 microsecond width pulse.

Figure 8:
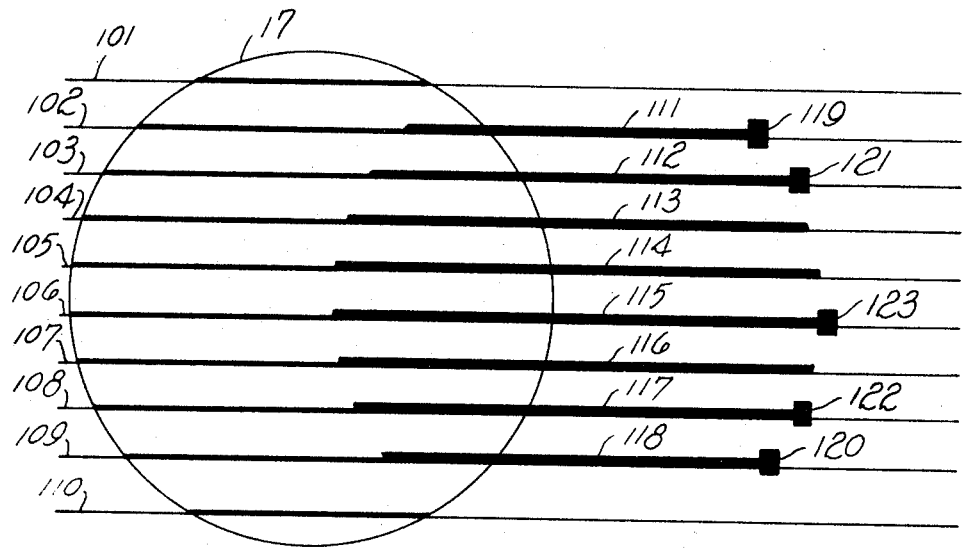
FIGS. 8 and 9 are illustrations of a scan of the object or pattern being sensed with various control pulses superimposed thereon.

Referring now to FIG. 8, along with FIG. 3, there are shown the various outputs of the trigger circuit 81 and the pulse width discriminators 84, 85 and 86 superimposed on a monitor presentation of the round pattern 17 as produced by the trigger circuit 77. Successive horizontal sweeps during one scan of the monitor follow along the lines 101–110. The sweeps 110 have a different intensity inside the circle 17 from the intensity outside the circle 17. The output pulses 111–118 from the trigger circuit 81 are displayed as a third intensity of the sweep. The output pulses 119 and 120 from the four microsecond pulse width discriminator 84, the output pulses 121 and 122 from the 5 microsecond pulse width discriminator 85 and the output pulse 123 from the 6 microsecond pulse width discriminator 86 are displayed as a fourth intensity of the horizontal sweep.

During the horizontal sweeps along lines 101 and 110, the pulses produced by the trigger circuit 77 representing respective chords of the pattern 17 do not have sufficient duration to pass through the low pass filter 80 and operate the trigger circuit 81. The pulses produced by trigger circuit 77 during sweeps 102–109 do have sufficient duration to operate the trigger circuit 81 to produce pulses 111–118. The pulses 111–118 from trigger 81 are delayed from the output pulses from trigger circuit 77 by a duration equal to the minimum duration of pulse which passes through the low pass filter 80 to operate the trigger circuit 81.

The pulses 111 and 118 produced by the trigger circuit 81 have a duration sufficiently near 4 microseconds to produce respective pulses 119 and 120 from the 4 microsecond pulse width discriminator 84. Similarly, the pulses 112 and 117 produce respective pulses 121 and 122 from the 5 microsecond pulse width discriminator 85. The pulse 115 produces pulse 123 from the 6 microsecond pulse width discriminator 86. In an actual embodiment, it may be desirable to have the magnification of the pattern 17 in the camera 11 such that many more horizontal sweeps intercept chords of the pattern 17. Also, the pulse width discriminators 84–86 may produce output pulses on several successive sweeps which intercept chords having durations sufficiently near the durations sensed by the respective pulse width discriminators 84–86. This allows for some slight variation in the size and shape of the pattern 17.

Figure 9:
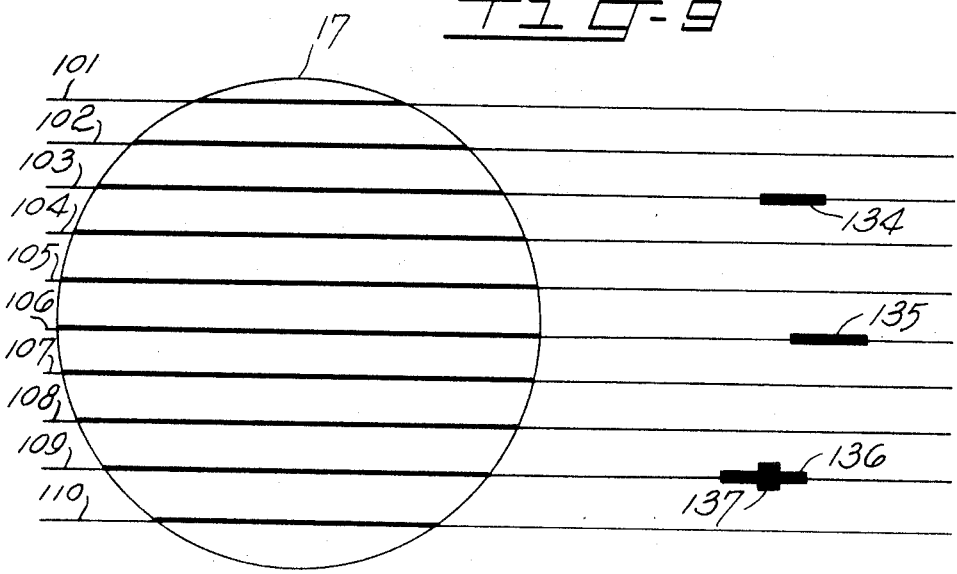

Referring to FIG. 3, the output of the pulse width discriminator 84 is applied to a delay generator 125. The delay generator, for example, may be two serially connected monostable multivibrators wherein the trailing edge of the output pulse from the first multivibrator triggers the second multivibrator to produce a delayed output pulse. Referring to FIGS. 8 and 9, the pulse 119 from the pulse width discriminator 84 operates the delay generator 125 to produce a delayed output pulse 134. The pulse 134 along with pulses 135, 136 and 137 are shown in FIG. 9, as being superimposed on a display of the pattern 17 as produced by the trigger circuit 77. The pulses 134–136 are shown having a different intensity from the pulses from trigger circuit 77 while the pulse 137 has a third intensity.

Referring back to FIG. 3, the output pulse 134 of the delay generator 125 and the output pulse 121 of the pulse width discriminator 85 are applied to two inputs of an AND gate 126. As seen in FIGS. 8 and 9, the pulse 134 is delayed from the pulse 119 by a duration slightly longer than the duration between the successive horizontal sweeps 102 and 103. The delayed pulse 134 coincides with the pulse 121 from the pulse width discriminator 85 to produce an output pulse from the AND gate 126. Where in an actual embodiment, the pulse width discriminator 84 produces several output pulses on successive horizontal sweeps, only the first pulse triggers the delay generator 125. The output pulse 134 of the delay generator 125 would then be delayed for several horizontal sweeps to correspond to a sweep which intercepts a 5 microsecond duration chord of the pattern 17. The delay generator 125 may not be triggered by an input pulse until after the output pulse 134 is produced.

The output of the AND gate 126 is applied to a delay generator 127 which produces an output pulse 135. As shown in FIGS. 8 and 9, the pulse 135 is delayed from the output of the AND gate 126 by a duration slightly greater than the duration between the horizontal sweeps 103 and 106. An AND gate 128 (FIG. 3) senses the coincidence of the pulse 135 and the pulse 123 from the pulse width discriminator 86 to produce an output pulse which is applied to the delay generator 129. The delay generator 129 then produces an output pulse 136 which is delayed from the output pulse of the AND gate 128 by a duration slightly less than the duration between horizontal sweeps 106 and 109. An AND gate 130 senses the coincidence of the pulse 136 with the pulse 120 from the pulse width discriminator 84 to produce an output pulse 137 which indicates the presence of a round pattern 17. The pulse 137 as viewed in FIG. 9, has predetermined vertical and horizontal displacements from the center of the pattern 17. These displacements correspond to durations of times which are utilized by the motor control circuit 24, (FIG. 1) to control the positioning of the object 10.

The number and operating characteristics of the pulse width discriminators 84–86, delay generators 125, 127 and 129, and AND gates 126, 128 and 130 may be varied to sense many different sizes and shapes of patterns. It is seen that an odd shaped pattern, such as spot 18 (FIG. 1) cannot possibly pass the timing requirements between predetermined length chords unless the spot 18 is very close in size and shape to the pattern 17. Thus, the spot 18 is rejected by the pattern detecting circuit 16.

HORIZONTAL AND VERTICAL CROSS HAIRS

Figure 6:
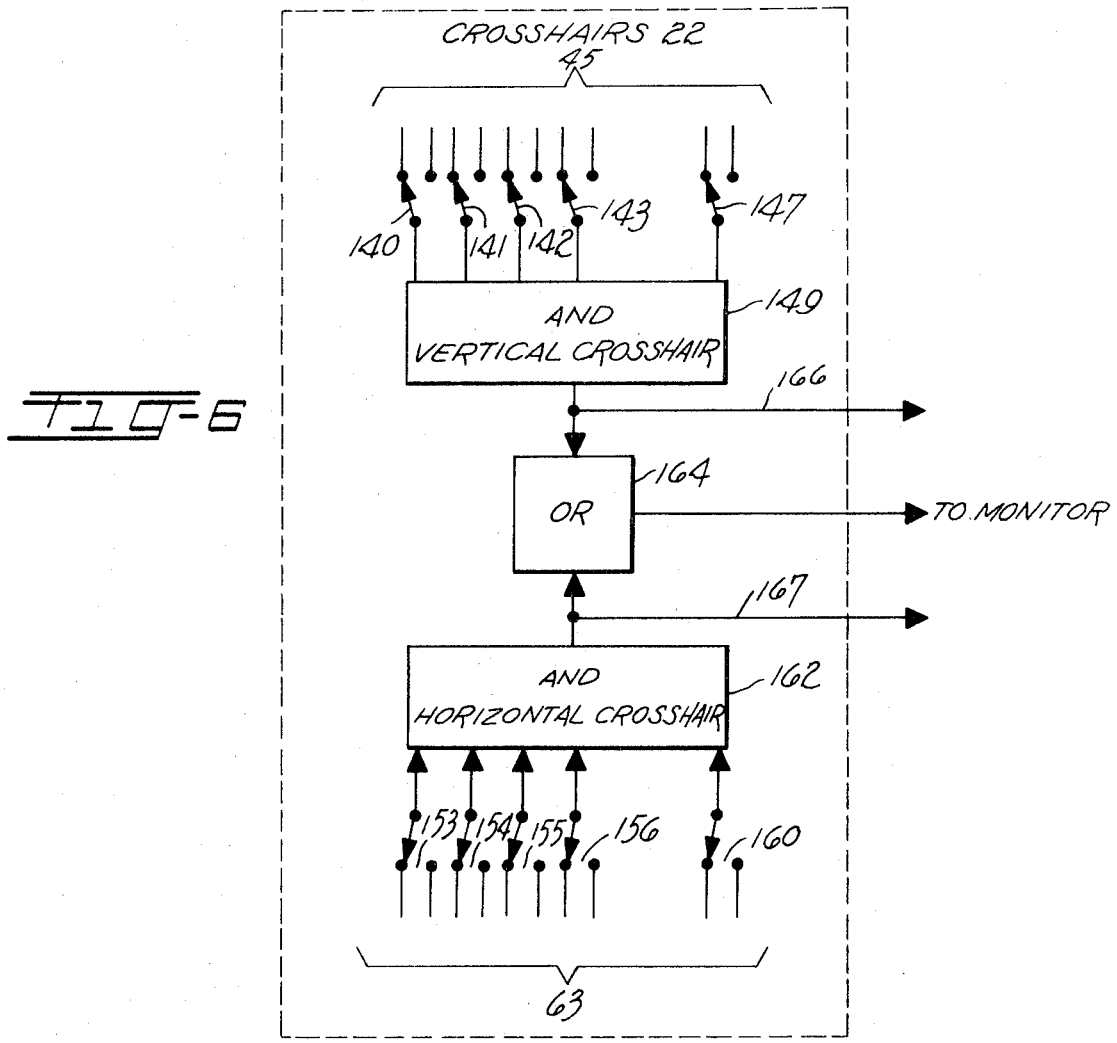
FIG. 6 is a detailed block diagram or a cross hair circuit shown in FIG. 1.

Referring now to FIG. 6, there is shown a schematic diagram of the cross hair circuit 22. The respective outputs 45 of the oscillator 35 and flip-flops 36–42 (FIG. 2) of the horizontal control circuit 20 are applied to terminals on switches 140-147. The switches 140–147 may be operated to connect 0 to 1 outputs from each of the oscillator 35 and flip-flops 36–42 to an AND gate 149 to determine the desired horizontal position of the center of the pattern 17. According to selections made by the switches 140–147, the AND gate 149 produces an output pulse at a selected time during each horizontal sweep. Referring to FIG. 1, when all the pulses produced on each horizontal sweep by the AND gate 149 are displayed on the monitor 30, a vertical cross hair 150 is produced.

Similarly, the outputs 63 of the flip-flops 54–61 (FIG. 2) of the vertical control circuit 21, are applied to respective terminals on switches 153–160. The switches 153 and 160 are selected by the operator to connect a 0 or 1 output of each of the flip-flops 54–61 to inputs of an AND gate 162. Thus, during one horizontal sweep, which is selected by the switches 153–160, the AND gate 162 produces an output pulse. This is shown in FIG. 1 on the monitor 30 by a horizontal cross hair 163.

The outputs of the AND gates 149 and 162 are applied to inputs of an OR gate 164 which is connected to the monitor 30 so that the cross hairs may be imposed upon the display shown by the monitor 30. The outputs of the AND gates 159 and 162 are also applied to respective lines 166 and 167 which are connected to the motor control circuit 24.

MOTOR POSITIONING CONTROL

Figure 5:
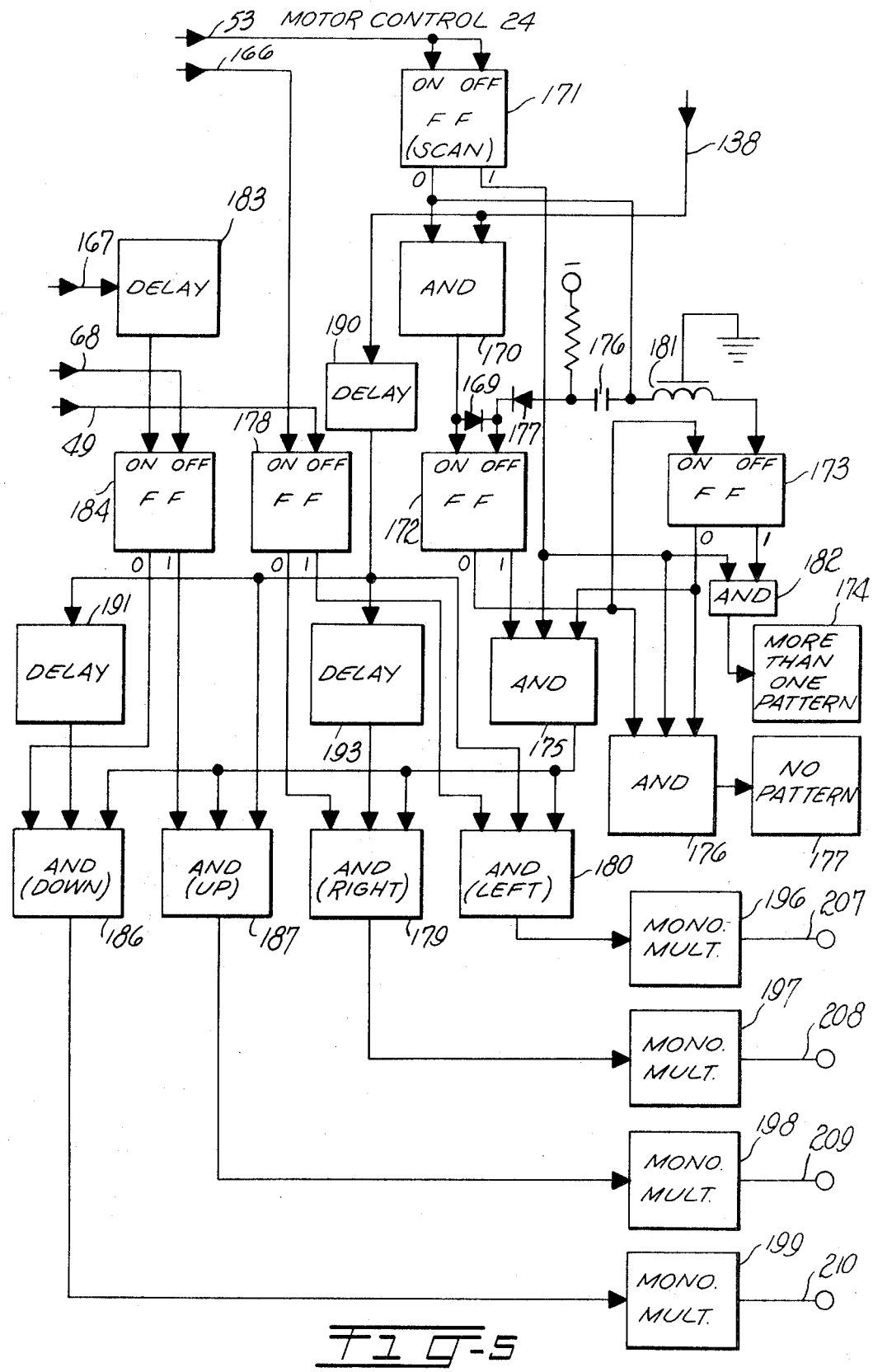
FIG. 5 is a detailed block diagram of the motor control circuit of FIG. 1.

Referring now to FIG. 5, there is shown the motor control circuit 24 which controls the operation of the motors 25 and 26 (FIG. 1) to position the workpiece 10 with respect to the camera 11. The output of the pattern detecting circuit 16 (FIG. 3) on line 138 is applied to one input of an AND gate 170. The output of the flip-flop 51 (FIG. 2) in the vertical control circuit 21, is connected by line 53 to the input of a flip-flop 171. The flip-flop 51 (FIG. 2) produces a pulse on line 53 during each vertical scan to trigger the flip-flop 171 on and off on alternate scans. One output of the flip-flop 171 is applied to the other input of the AND gate 170 such that pulses on line 138 pass through the AND gate 170 only during alternate scan when the flip-flop 171 is off.

The output of the AND gate 170 is applied to the "on" input of a flip-flop 172 and by a diode 169 to the "off" input of the flip-flop 172. The state of the flip-flop 172 is switched by each pattern sensed by the pattern sensing circuit 16 (FIG. 3) during the alternate scan when the flip-flop 171 is off. For example, if two patterns are sensed by the pattern sensing circuit 16, the flip-flop 172 is turned on by the first pulse on line 138 and turned off by the second pulse on line 138. The 0 output of the flip-flop 172 is connected to the "on" input of the flip-flop 173 to turn the flip-flop 173 on when the flip-flop 172 switches from on to off. The flip-flop 173 is switched on only if two or more pulses occur on the line 138 during the alternate scan when flip-flop 171 is off.

The 0 output of the flip-flop 171 is connected by a capacitor 176 and a diode 177 to the "off" input of the flip-flop 172 and by a delay line 181 to the "off" input of the flip-flop 173. When the flip-flop 171 is switched from on to off, the flip-flops 172 and 173 are turned off so that the number of pulses on line 138 may be counted. The diode 169 prevents the 0 output of the flip-flop 171 from being applied to the "on" input of flip-flop 172. The diode 177 prevents the output of the AND gate 170 from being applied to the "off" input of the flip-flop 173. The delay line 181 delays the pulse from the 0 output of flip-flop 171 sufficiently to allow the flip-flop 172 to turn from on to off before the flip-flop 173 is turned off so that the flip-flop 173 is not erroneously turned on by the flip-flop 172 being turned off by the flip-flop 171.

The 1 outputs of the flip-flops 171 and 173 are connected to inputs of an AND gate 182 to produce an output signal if the flip-flop 173 is on when the flip-flop 171 is turned on. The output of the AND gate 182 actuates an alarm or indicator 174 to notify an operator that more than one pattern has been sensed by the pattern detecting circuit 16. Similarly, the 0 outputs of the flip-flops 172 and 173 are connected to inputs of an AND gate 176 along with the 1 output from the flip-flop 171 such that the AND gate 176 produces an output signal if no pattern was sensed by the pattern detecting circuit 16. The AND gate 176 operates an alarm or indicator 177. The 1 outputs of the flip-flops 171 and 172 along with the 0 output of the flip-flop 173 are connected to the inputs of an AND gate 175 to produce an output signal only if one pattern is sensed by the pattern sensing circuit 16. The output of the AND gate 175 is connected to inputs on respective motor driving AND gates 179, 180, 186 and 187. Signals are applied to these inputs of AND gates 179, 180 186 and 187 during an alternate scan when the flip-flop 171 is on only if one pattern was counted by the flip-flops 172 and 173 during the previous scan.

The output of the AND gate 149 (FIG. 6) of the cross hair circuit 22 on line 166 is applied to the "on" input of a flip-flop 178 to switch the flip-flop 178 on when the AND gate 149 produces an output pulse. The line 49, connected from the AND gate 46 (FIG. 2) of the horizontal control circuit 20, applies a pulse to the "off" input of the flip-flop 178 at time H-0 to turn off the flip-flop 178. The flip-flop 178 is turned on during the last half of each horizontal sweep and turned off during the first half of each horizontal sweep. The 0 and 1 outputs of the flip-flop 178 are applied to respective inputs of AND gates 179 and 180 such that a signal is applied to the AND gate 179 during the first half of each horizontal sweep and a signal is applied to the AND gate 180 during the last half of each horizontal sweep. Referring to FIG. 1, the first half of the horizontal sweep is left of the cross hair 150 and the last half is to the right of the cross hair 150.

Similarly, the output of the AND gate 162 (FIG. 6) of the cross hair circuit 22 is applied over line 167 through a delay 183 to the "on" input of a flip-flop 184. Referring to FIG. 9, it is shown that the pulse 137 is produced some vertical distance below the exact center of the pattern 17. For example, if the horizontal sweep 106 is taken to be the vertical center of the pattern 17, the pulse 137 is produced three sweeps lower on sweep 109. In addition, a delay circuit 190 (FIG. 5) and a delay circuit 191 delay the pulse 137 for two additional horizontal sweeps, as hereinafter described. The delay circuit 183 of FIG. 5 delays the output pulse of the AND gate 162 by a duration equal to five horizontal sweeps to correspond to the delay from the vertical center of the pattern 17 to the output pulse from the delay circuit 191. The output of the delay 183 switches the flip-flop 184 on at the start of the fifth horizontal sweep after the horizontal cross hair 163 (FIG. 1). Line 68 from the AND gate 64 (FIG. 2) of the vertical control circuit 21 applies a pulse at time V-0 to the "off" input of the flip-flop 184 to switch the flop-flop 184 off for the first half of the vertical scan.

The 0 and 1 outputs of the flip-flop 184 are applied to inputs of respective AND gates 186 and 187 to apply a signal to the AND gate 186 during the first part of each vertical scan up to the start of the fifth hori-zontal sweep after the horizontal cross hair 163 (FIG. 1) and to apply a signal to the AND gate 187 during the last half of the vertical sweep after the start of the fifth horizontal sweep after the horizontal cross hair 163.

The output of the pattern detecting circuit 16 on line 138 is applied to the delay circuit 190. Referring to FIG. 9, it is seen that the pulse 137 produced on line 138 is displaced to the right of the exact horizontal center of the pattern 17. The delay 190 is chosen to delay the pulse 137 for a duration equal to the duration between successive horizontal sweeps minus the duration required for the horizontal sweep to move from the exact horizontal center of the pattern 17 to the position of the pulse 137. The output pulse of the delay circuit 190 is thus along a vertical line through the horizontal center of the pattern 17.

Referring back to FIG. 5, the output of the delay circuit 190 is applied to respective inputs of the AND gates 180 and 187. When signals are applied to the other two inputs of the AND gate 180 during the last half of each horizontal sweep occurring in alternate vertical scans, a pulse from the delay circuit 190 produces a pulse output on the AND gate 180. Similarly, the AND gate 187 produces an output pulse if the delay circuit 190 applies an input pulse to the AND gate 187 when input signals are applied to the other two inputs of the AND gate 187 during the last part of each alternate vertical scan.

The output of the delay circuit 190 is applied by a delay circuit 191 to the third input of the AND gate 186. The delay circuit 191 delays the pulse from the delay circuit 190 for a duration equal to the duration of one horizontal sweep, which corresponds to a desired vertical tolerance. The delay may be several horizontal sweeps if less tolerance is desirable. If the pulse from the delay 190 occurs more than one horizontal sweep before the flip-flop 184 is actuated, the AND gate 186 produces an output pulse. If the output pulse of delay circuit 190 is produced less than one horizontal sweep before the flip-flop 184 is actuated, the pulse from delay circuit 190 reaches AND gate 187 before a signal is applied to its input by the flip-flop 184 but reaches AND gate 186 after the flip-flop 184 has been turned on to remove the signal from the input to the AND gate 186. Thus, neither AND gate 186 nor 187 produce an output signal if the output of the delay circuit 190 occurs less than one horizontal sweep before the flip-flop 184 is turned on.

The output of the delay circuit 190 is applied by a delay circuit 190 to the remaining input of the AND gate 179. The delay circuit 193 delays the output of the delay circuit 190 by an amount equal to a desired tolerance for the exact horizontal center. If the pulse from delay circuit 190 occurs during the desired horizontal tolerance, the pulse from delay circuit 190 is applied to the AND gate 180 before the flip-flop 178 has been turned on to apply a signal to the AND gate 180 and the pulse from delay circuit 190 is applied by delay 193 to the AND gate 179 after the flip-flop 184 has been turned on to remove the input signal from the AND gate 179. Thus, no pulse is produced on the outputs of the AND gates 179 and 180. If the pulse on delay circuit 190 occurs more than the desired tolerance before the flip-flop 184 is actuated, an output pulse is produced on the AND gate 179. The same horizontal and vertical tolerances may be obtained by placing the delays 191 and 193 in series with the 1 outputs of the respective flip-flops 184 and 178.

The outputs of the AND gates 179, 180, 186, and 187 are applied to respective monostable multivibrators 197, 196, 199 and 198. The actuation times of the monostable multivibrators 196-199 are selected to obtain optimum driving times for the respective motors 25 and 26.

Figure 7:
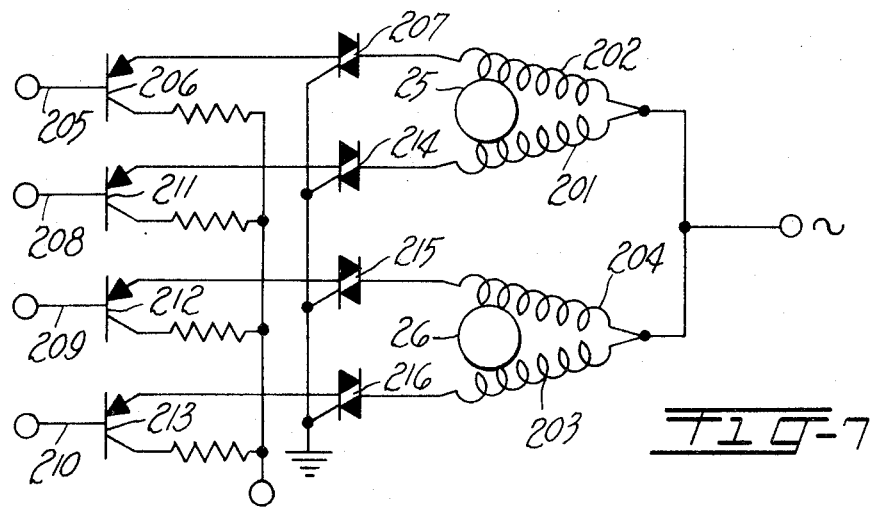
FIG. 7 is a detailed drawing showing the motor drive circuitry for positioning a workpiece relative to a tool.

Referring now to FIG. 7, the motor 25 has a forward winding 201 and a reverse winding 202. Similarly, the motor 26 has a forward winding 203 and a reverse winding 204. The output of the monostable multivibrator 196 (FIG. 5) on line 205, is applied by a transistor 206 to the control electrode of a triac 207. The triac 207 is connected in series with an AC voltage source and the reverse winding 202. If the monostable multivibrator 196 is actuated by an output from AND gate 180, the triac 207 is rendered conductive to drive the motor 205 in a reverse direction. Driving the motor 25 in a reverse direction moves the object 10 (FIG. 1) from right to left as viewed by the monitor 30.

Similarly, the output of the multivibrators 197, 198 and 199 on respective lines 208, 209 and 210 operate respective transistors 211, 212, and 213 to control respective triacs 214, 215 and 216 connected in series with the respective windings 201, 204 and 203. If the pattern 17, as viewed by the monitor 30, is to the left of the vertical cross hair 150, the motor 25 is operated in a forward direction until the horizontal center of the pattern 17 is aligned with the vertical cross hair 150, at which time the motor 25 stops. Similarly, if the vertical center of the pattern 17 is below the cross hair 163, the motor 26 is operated in a reverse direction to move the object 10 upwards as viewed by the monitor 30 until the vertical center of the pattern 17 is aligned with the cross hair 163, at which time the motor 26 stops.

It is to be understood that the above-described embodiments are simply illustrative of the principles of the invention and that many other embodiments may be devised without departing from the scope and spirit of the invention.

What is claimed is:

1. A system for positioning a work-piece relative to an apparatus comprising:
    means for sensing a predetermined size and shape of a pattern associated with the workpiece;
    means for moving the workpiece relative to the apparatus until the pattern assumes a predetermined position relative to the apparatus; and
    means for sensing the number of patterns having the predetermined size and shape associated with the workpiece to render the object moving means inoperative if less than one pattern or more than one pattern is sensed.

2. A system for positioning an object relative to an apparatus comprising:
    a video camera mounted on the apparatus for producing a video signal indicative of at least a portion of the object in the field of view of the camera;
    means for detecting a predetermined size and shape of a pattern in the video signal;
    means for moving the object relative to the apparatus until the pattern reaches a predetermined position within the field viewed by the camera; and
    means for sensing the number of patterns having the predetermined size and shape in the field of view of the camera to render the object moving means inoperative if less than one pattern or more than one pattern is sensed.

3. A circuit for detecting a predetermined size and shape of a pattern in a video signal having voltages corresponding to light intensities on successive horizontal sweeps comprising:
    means for sensing a pulse having a first predetermined width in the video signal to produce a first signal wherein pulses substantially less or greater than said first predetermined width are rejected;
    means for delaying the first signal for a predetermined duration;
    means for sensing a pulse having a second predetermined width in the video signal to produce a second signal wherein pulses substantially less or greater than said second predetermined width are rejected; and
    means for sensing a coincidence of the second signal and the delayed first signal to indicate a predetermined size and shape of a pattern.

4. A system for positioning an object with respect to an apparatus, comprising:
    video camera means mounted on the apparatus for generating a video signal representing light intensity on successive horizontal sweeps during a vertical scan across a field of view wherein the horizontal sweeps are interlaced on alternate scans;
    timing means operated in cooperation with each horizontal sweep to produce a first pulse with a predetermined time relationship with respect to each horizontal sweep;
    means for sensing a representation of the object in the video signal to produce a second pulse having a time relationship relative to a horizontal sweep dependent upon the position of the object within the field of view; and
    means rendered operative only during alternate scans for moving the object relative to the apparatus until the second pulse reaches a predetermined time relationship with respect to a first pulse.

5. A system for positioning an object with respect to an apparatus as defined in claim 4, and which includes:
    means for determining the number of objects sensed by the sensing means during a first of two interlaced scans to produce an output signal to render the object moving means operative during the second of the two interlaced scans if only one object was sensed by the sensing means.

6. A system for positioning an object with respect to an apparatus as defined in claim 4 wherein the sensing means includes:
    means for sensing a pulse having a first predetermined width in the video signal to produce a first signal;
    means for delaying the first signal for a predetermined duration;
    means for sensing a pulse having a second predetermined width in the video signal to produce a second signal; and
    means for sensing a coincidence of the second signal and the delayed first signal to produce the second pulse having a time relationship relative to a horizontal sweep dependent upon the position of a predetermined size and shape of a pattern associated with the object within the field of view.

7. A system for positioning an object with respect to an apparatus as defined in claim 4 wherein the object moving means includes:
    means having two states and responsive to the timing means for operating in a first state before each first pulse and in a second state after each first pulse;
    means responsive to the two-state means in the first state and to a second pulse from the sensing means occur-ring during the first state for moving the object in a first direction relative to the apparatus; and
    means responsive to the two-state means in the second state and to a second pulse from the sensing means occur-ring during the second state for moving the object in a second direction relative to the apparatus.

8. A system for positioning an object with respect to an apparatus as defined in claim 4, wherein the sensing means includes:
   means for sensing a pulse having a first predetermined width in the video signal to produce a first signal;
   means for delaying the first signal for a predetermined duration;
   means for sensing a pulse having a second predetermined width in the video signal to produce a second signal; and
   means for sensing a coincidence of the second signal and the delayed first signal to produce the second pulse having a time relationship relative to a horizontal sweep dependent upon the position of a predetermined size and shape of a pattern associated with the object within the field of view; and wherein the moving means includes:
   means having two states and responsive to the timing means for operating in a first state before each first pulse and in a second state after each first pulse;
   means responsive to the two-state means in the first state and to the second pulse from the coincidence sensing means occurring during the first state for moving the object in a first direction relative to the apparatus; and
   means responsive to the two-state means in the second state and to the second pulse from the coincidence sensing means occurring during the second state for moving the object in a second direction, opposite to the first direction, relative to the apparatus.

9. A system for positioning an object with respect to an apparatus, comprising:
   video camera means mounted on the apparatus for generating a video signal representing light intensity on successive horizontal sweeps during a vertical scan across a field of view wherein the horizontal sweeps are interlaced on alternate scans;
   means for detecting a predetermined size and shape of a pattern associated wih the object in the video signal to produce a first pulse having a time relationship relative to a horizontal sweep dependent upon the position of the object within the field of view;
   timing means operated in cooperation with each horizontal sweep to produce a second pulse with a predetermined time relationship with respect to each horizontal sweep; and
   means rendered operative only during alternate scans for moving the object relative to the apparatus until the first pulse reaches a predetermined time relationship with respect to a second pulse.

10. A system for positioning an object relative to an apparatus, comprising:
   video camera means mounted on the apparatus for generating a video signal representing light intensity on successive horizontal sweeps during a vertical scan across a field of view wherein the horizontal sweeps are interlaced on first and second alternate scans;
   timing means operated in cooperation with each second alternate scan to produce a first pulse having a predetermined time relationship with respect to each second alternate scan;
   means for sensing a representation of the object in the video signal to produce a second pulse having a time relationship relative to each second alternate scan dependent upon the vertical position of the object within the field of view; and
   means rendered operative only during each second alternate scan for moving the object relative to the apparatus until each second pulse reaches a predetermined time relationship with respect to each first pulse.

11. A system for positioning an object with respect to an apparatus as defined in claim 10 and which includes:
   means for determining the number of objects sensed by the sensing means during each first alternate scan to produce an output signal to render the object moving means operative during each second alternate scan if only one object was sensed by the sensing means.

12. A system for positioning an object relative to an apparatus as defined in claim 10, wherein the sensing means includes:
   means for sensing a pulse having a first predetermined width in the video signal to produce a first signal;
   means for delaying the first signal for a predetermined duration;
   means for sensing a pulse having a second predetermined width in the video signal to produce a second signal; and
   means for sensing a coincidence of the second signal, and the delayed first signal to produce the second pulse having a time relationship relative to each second alternate scan dependent upon the position of a predetermined size and shape of a pattern associated wih the object within the field of view.

13. A system for positioning an object with respect to an apparatus as defined in claim 10, wherein the object moving means includes:
   means having two states and responsive to the timing means for operating in a first state before each first pulse and in a second state after each first pulse;
   means responsive to the two-state means in the first state and to a second pulse from the sensing means occurring during the first state for moving the object in a first direction relative to the apparatus; and
   means responsive to the two-state means in the second state and to a second pulse from the sensing means occurring during the second state for moving the object in a second direction, opposite to the first direction, relative to the apparatus.

14. A system for positioning an object with respect to an apparatus as defined in claim 10 wherein the sensing means includes:
   means for sensing a pulse having a first predetermined width in the video signal to produce a first signal;
   means for delaying the first signal for a predetermined duration;
   means for sensing a pulse having a second predetermined width in the video signal to produce a second signal;
   means for sensing a coincidence of the second signal and the delayed first signal to produce the second pulse having a time relationship relative to each second alternate scan dependent upon the position of a predetermined size and shape of a pattern associated with the object within the field of view; and wherein the moving means includes:

means having two states and responsive to the timing means for operating in a first state before each first pulse and in a second state after each first pulse;

means responsive to the two-state means in the first state and to the second pulse from the coincidence sensing means occurring during the first state for moving the object in a first direction relative to the apparatus; and means responsive to the two-state means in the second state and to the second pulse from the coincidence sensing means occurring during the second state for moving the object in a second direction, opposite to the first direction, relative to the apparatus.

15. A system for positioning an object relative to an apparatus, comprising:

video camera means mounted on the apparatus for generating a video signal representing light intensity on successive horizontal sweeps during a vertical scan across a field of view wherein the horizontal sweeps are interlaced on first and second alternate scans;

means for detecting a predetermined size and shape of a pattern associated with the object in the video signal to produce a first pulse having a time relationship relative to each second alternate scan dependent upon the vertical position of the object within the field of view;

timing means operated in cooperation with each second alternate scan to produce a second pulse having a desired time relationship with respect to each second alternate scan; and means rendered operative only during each second alternate scan for moving the object relative to the apparatus until the first pulse reaches a predetermined time relationship with respect to each second pulse.

16. A system for positioning an object with respect to an apparatus comprising:

a video camera means mounted on the apparatus for producing a sync pulse and for producing a video signal indicative of at least a portion of the object in the field of view of the camera;

means for detecting a predetermined size and shape of a pattern in the video signal to produce a first pulse having a time relationship relative to the sync pulse indicative of the actual position of the object with respect to the apparatus;

means for producing a second pulse having a time relationship relative to the sync pulse indicative of the desired position of the object;

means having two states and responsive to the second pulse-producing means for operating in a first state before the second pulse and in a second state after the second pulse;

means responsive to the two-state means in the first state and to a first pulse from the first pulse producing means occurring during the first state for moving the object in a first direction relative to the apparatus; and means responsive to the two-state means in the second state and to a first pulse from the first pulse-producing means occurring during the second state for moving the object in a second direction, opposite to the first direction, relative to the apparatus.

17. A system for positioning an object relative to an apparatus, comprising:

video camera means mounted on the apparatus for generating a video signal representing light intensity on successive horizontal sweeps during a vertical scan across a field of view wherein the horizontal sweeps are interlaced on first and second alternate scans;

first timing means operated in cooperation with each horizontal sweep to produce a first pulse with a desired time relationship with respect to each horizontal sweep;

second timing means operated in cooperation with each second alternate scan to produce a second pulse having a desired time relationship with respect to each second alternate scan;

means for sensing a representation of the object in the video signal to produce a third pulse having a time relationship dependent upon the position of the object within the field of view;

first moving means rendered operative only during each second alternate scan for moving the object relative to the apparatus along a first axis corresponding to a horizontal axis in the camera means until the third pulse reaches a predetermined time relationship with respect to a first pulse; and second moving means rendered operative only during each second alternative scan for moving the object relative to the apparatus along a second axis corresponding to a vertical axis in the camera means until the third pulse reaches a predetermined time relationship with respect to the second pulse.

18. A system for positioning an object with respect to an apparatus as defined in claim 17 and which includes:

means for determining the number of objects sensed by the sensing means during each first alternate scan to produce an output signal to render the first and second object moving means operative during each second alternate scan if only one object was sensed by the sensing means during the first scan.

19. A system for positioning an object with respect to an apparatus as defined in claim 17 wherein the sensing means includes:

means for detecting a predetermined size and shape of a pattern in the video signal to produce the third pulse having a time relationship dependent upon the position of the pattern within the field of view.

20. A system for positioning an object with respect to an apparatus as defined in claim 17 wherein the sensing means includes:

means for sensing a pulse having a first predetermined width in the video signal to produce a first signal;

means for delaying the first signal for a predetermined duration;

means for sensing a pulse having a second predetermined width in the video signal to produce a second signal; and means for sensing a coincidence of the second signal and the delayed first signal to produce the third pulse having a time relationship dependent upon the position of a predetermined size and shape of a pattern associated with the object within the field of view.

21. A system for positioning an object with respect to an apparatus as defined in claim 17 wherein the first axis moving means includes:

first two state means responsive to the first timing means for operating in a first state before each first pulse and in a second state after each first pulse;

means responsive to the two-state means in the first state and to the third pulse from the sensing means occurring during the first state for moving the object in a first direction along the first axis relative to the apparatus;

means responsive to the first two-state means in the second state and to a third pulse from the sensing means occurring during the second state for moving the object in a second direction along the first axis relative to the apparatus;

second two-state means responsive to the second timing means for operating in a first state before each second pulse and in a second state after each second pulse;

means responsive to the second two-state means in the first state and to a third pulse from the sensing means occurring during the first state for moving the object in a first direction along a second axis relative to the apparatus; and means responsive to the second two-state means in the second state and to a third pulse from the sensing means occurring during the second state for moving the object in a second direction along the second axis relative to the apparatus.

22. A system for positioning an object with respect to an apparatus, comprising:

means for producing a first pulse having a time relationship relative to a sync pulse indicative of the actual position of the object with respect to the apparatus;

means for producing a second pulse having a time relationship relative to the sync pulse indicative of the desired position of the object;

means having two states and responsive to the second pulse producing means for operating a first state before the second pulse and in a second state after the second pulse;

means responsive to the two state means in the first state and to a first pulse from the first pulse producing means occurring during the first state for moving the object in a first direction relative to the apparatus;

means responsive to the two state means in the second state and to a first pulse from the first pulse producing means occurring during the second state for moving the object in a second direction, opposite to the first direction, relative to the apparatus; and delay means interposed between the first pulse-producing means and the first direction moving means for determining a tolerance range within which the object may be positioned.

23. A system for positioning an object with respect to an apparatus, comprising:

means for sensing a predetermined size and shape of a pattern associated with the object to produce a first pulse having a time relationship relative to a sync pulse dependent upon the position of the object within the field of view;

means for producing a second pulse having a time relationship relative to the sync pulse indicative of the desired position of the object;

means having two states and responsive to the second pulse producing means for operating in a first state before the second pulse and in a second state after the second pulse;

means responsive to the two state means in the first state and to a first pulse from the first pulse producing means occurring during the first state for moving the object in a first direction relative to the apparatus; and means responsive to the two state means in the second state and to a first pulse from the first pulse producing means occurring during the second state for moving the object in a second direction, opposite to the first direction, relative to the apparatus.

24. A system for positioning an object with respect to an apparatus as defined in claim 23 and which includes:

delay means interposed between the sensing means and the first direction moving means for determining a tolerance range within which the object may be positioned.

25. A system for positioning an object with respect to an apparatus as defined in claim 23 and which includes:

delay means interposed between the second pulse-producing means and the second direction moving means for determining a tolerance range within which the object may be positioned.

26. A system for positioning an object with respect to an apparatus, comprising:

means for producing a first pulse having a time relationship indicative of the actual position of the object with respect to the apparatus;

means for producing a second pulse having a time relationship indicative of the desired position of the object;

means having two states and responsive to the second pulse producing means for operating in a first state before the second pulse and in a second state after the second pulse;

means responsive to the two state means in the first state and to a first pulse from the first pulse producing means occurring during the first state for moving the object in a first direction relative to the apparatus;

means responsive to the two state means in the second state and to a first pulse from the first pulse producing means occurring during the second state for moving the object in a second direction, opposite to the first direction, relative to the apparatus; and delay means interposed between the second pulse-producing means and the second direction moving means for determining a tolerance range within which the object may be positioned.

* * * * *